(12) United States Patent
Bosch (10) Patent No.: US 9,400,629 B2
(45) Date of Patent: Jul. 26, 2016

(54) TAPE MEASURE WITH AUDIO RECORDER

(71) Applicant: Richard Bosch, Dunnville (CA)

(72) Inventor: Richard Bosch, Dunnville (CA)

( * ) Notice: Subject to any disclaimer, the term of this patent is extended or adjusted under 35 U.S.C. 154(b) by 0 days.

(21) Appl. No.: 14/705,043

(22) Filed: May 6, 2015

(65) Prior Publication Data

US 2015/0331871 A1   Nov. 19, 2015

Related U.S. Application Data

(60) Provisional application No. 61/993,088, filed on May 14, 2014.

(51) Int. Cl.
| | |
|---|---|
| H04W 4/10 | (2009.01) |
| G06F 3/16 | (2006.01) |
| G06F 17/30 | (2006.01) |
| H04M 1/02 | (2006.01) |
| H04M 1/60 | (2006.01) |
| G11B 19/02 | (2006.01) |
| H04M 1/725 | (2006.01) |

(52) U.S. Cl.
CPC *G06F 3/16* (2013.01); *G06F 3/165* (2013.01); *G06F 17/30* (2013.01); *G06F 17/3074* (2013.01); *G06F 17/30746* (2013.01); *G11B 19/02* (2013.01); *H04M 1/0202* (2013.01); *H04M 1/6058* (2013.01); *H04M 1/7253* (2013.01); *H04W 4/10* (2013.01)

(58) Field of Classification Search
None
See application file for complete search history.

(56) References Cited

U.S. PATENT DOCUMENTS

| 4,963,995 A * | 10/1990 | Lang | G11B 5/86 348/E7.04 |
|---|---|---|---|
| 2002/0088135 A1* | 7/2002 | Arlinsky | G01B 3/1041 33/760 |
| 2012/0203124 A1* | 8/2012 | Lim | A61B 5/0404 600/523 |

* cited by examiner

*Primary Examiner* — Diane Mizrahi (57) ABSTRACT

The present invention is a tape measure in combination with a data transceiver, a headset, and a cell phone. The invention includes a data transceiver with a housing that can be mounted to a tape measure, where the housing features numerous selectors including at least one record button and one playback button. The present invention further involves the transceiver in communication with a first user cell phone for instructing recordation of verbal analog data received from a head set when a record button is depressed. The cell phone also includes an application for converting verbal information into digital data using voice recognition software, communicating and storing the digital data, and communicating analog data. The present invention alternatively allows for playback of the recorded data to the headset when a playback button is depressed. Another embodiment allows for communication between the cell phones of a first and a second user and an associated headset.

20 Claims, 12 Drawing Sheets

Log every oral command for quality control

Fig. 12

Project blueprints loaded into the app onto any surface

TAPE MEASURE WITH AUDIO RECORDER

FIELD OF THE INVENTION

The present invention relates to tape measures and in particular relates to tape measures which include an audio recording device attached thereto.

BACKGROUND OF THE INVENTION

Users of a conventional type tape measuring devices are required to either manually or mentally make a record of the measurement which they are taking. Individuals using conventional tape measuring devices either carry pads of paper and pen or pencil with them to record the measurements that they are taking or simply commit them to memory. The use of pencil and paper to record the measurements is extremely cumbersome and committing the measurements to memory often can result in errors and/or having to re-measure forgotten dimensions.

There is a need for a tape measure which eliminates the use of pencil and paper and eliminates the need for committing to memory dimensions and measurements that have been taken with a tape measure in order to more efficiently and effectively use a tape measure in the field.

SUMMARY OF THE INVENTION

The present concept a tape measure in combination with an audio comprising:
a) A voice recorder includes a front cover, a push pad, a circuit board and a back cover.
b) Wherein the voice recorder adapted to record and play back audio recordings.
c) Wherein the voice recorder is releasably attached to the tape measure such that the back cover abuts against a side of the tape measure.

Preferably wherein the front cover, the push pad, the circuit board and the back cover are layers of uniform outer dimension which are sandwiched together to form a unitary layered structure.

Preferably wherein each of the layers is circular each having the same outer diameter.

Preferably wherein the push pad is sandwiched between the front cover and the circuit board and includes button pads for controlling the recording and playback functions.

Preferably wherein the circuit board is sandwiched between the push pad and the back cover end includes a battery compartment and a speaker compartment.

The present concept a tape measure in combination with an attachable data transceiver, a headset and a cell phone comprising:
a) a data transceiver for mounting to a tape measure;
b) the data transceiver includes a housing with numerous selectors including at least one record button and one playback button; the transceiver housing for mounting to a tape measure;
c) the transceiver is in communication with a first user cell phone, wherein depressing the record button instructs the cell phone to record verbal analogue data received from a headset Preferably wherein the cell phone includes a cell phone application for recording and playback of analogue data.

Preferably wherein the cell phone including a cell phone application for converting verbal analogue data into digital data using voice recognition software and recording and playback of the digital data.

Preferably wherein when the at least one playback button is depressed the data transceiver instructs the cell phone to playback the recorded digital data to the headset.

Preferably wherein further including at least two users, each user includes a data transceiver including a user selector, a tape measure, a headset and a cell phone, the user selector for instructing connection of the first users cell phone to at least one other second user cell phone by placing the user selector in the appropriate position, such that depressing the record button instructs simultaneous recordation of data received from a first headset onto the first and second user's cell phone wherein each cell phone is equipped with the cell phone application and is in communication with an associated headset.

Preferably such that depressing the playback button on either the first or second users data transceiver instructs simultaneous playback of data on the first user's cell phone to the first and the second user's headsets.

Preferably wherein the data transceiver further includes a calculate button selector which when pushed instructs the cell phone application to add together the last two recorded data points and record a calculated addition.

Preferably wherein the data transceiver further includes a respond button selector which when pushed instructs the cell phone application to playback the calculated addition to the user selected headsets.

Preferably wherein the data transceiver further includes a drawing button selector which when pushed instructs the cell phone application to project drawings stored in the cell phone using a LED projector light in the tape measure.

Preferably wherein the data transceiver further includes a walkie-talkie button selector which when pushed instructs the cell phone application to transmit in real time any voice data received from first users headset to the user selected phone and associated headset, thereby permitting selected users to speak to each other in walkie-talkie fashion.

Preferably wherein the digital data is numerical tape measurements.

Preferably wherein the data transceiver attached to the tape measure with a centrally located fastener.

Preferably wherein the data transceiver includes a cylindrical puck shaped housing for attaching to a side of the tape measure using a centrally located screw.

The present concept a digital tape measure in combination with a data transceiver, a headset and a cell phone comprising:
a) a data transceiver;
b) the data transceiver includes a housing with numerous selectors including at least one record button and one playback button; the transceiver receiving digital measurement data from the tape measure when the tape of the tape measure is extended;
c) the transceiver in communication with a first user cell phone, wherein depressing the record button instructs the cell phone to record digital data received from the tape measure.
d) the cell phone including a cell phone application for communicating and storing digital data.

Preferably wherein when the at least one playback button is depressed the data transceiver instructs the cell phone to playback the recorded digital data to the headset.

Preferably wherein further including at least two users, each user includes a data transceiver including a user selector, a tape measure, a headset and a cell phone, the user selector for instructing connection of the first users cell phone to at least one other second users cell phone by placing the user selector in the appropriate position, such that depressing the record button instructs simultaneous recordation of data received from a first tape measure onto the first and second user's cell phone wherein each cell phone is equipped with the cell phone application and is in communication with an associated headset.

Preferably such that depressing the playback button on either the first or second users data transceiver instructs simultaneous playback of data on the first user's cell phone to the first and the second user's headsets.

The present concept a tape measure in combination with a data transceiver, a headset and a cell phone comprising:
a) a data transceiver integrally part of the tape measure;
b) the data transceiver includes a housing with numerous selectors including at least one record button and one playback button;
c) the transceiver is in communication with a first user cell phone, wherein depressing the record button instructs the cell phone to record verbal analogue data received from a headset.

Preferably wherein when the at least one playback button is depressed the data transceiver instructs the cell phone to playback the recorded data to the headset.

Preferably wherein further including at least two users, each user includes a data transceiver including a user selector, a tape measure, a headset and a cell phone, the user selector for instructing connection of the first users cell phone to at least one other second user cell phone by placing the user selector in the appropriate position, such that depressing the record button instructs simultaneous recordation of data received from a first headset onto the first and second user's cell phone wherein each cell phone is equipped with the cell phone application and is in communication with an associated headset.

BRIEF DESCRIPTION OF THE DRAWINGS

The present concept will now be described by way of example only with reference to the following drawings in which.

DETAILED DESCRIPTION OF THE PREFERRED EMBODIMENTS

Referring now to FIGS. 1 through 4 which show the first embodiment namely tape measure with audio recorder shown generally as 100 which includes the following major components namely; voice recorder 102 attached to tape measure 104.

Figure 1:
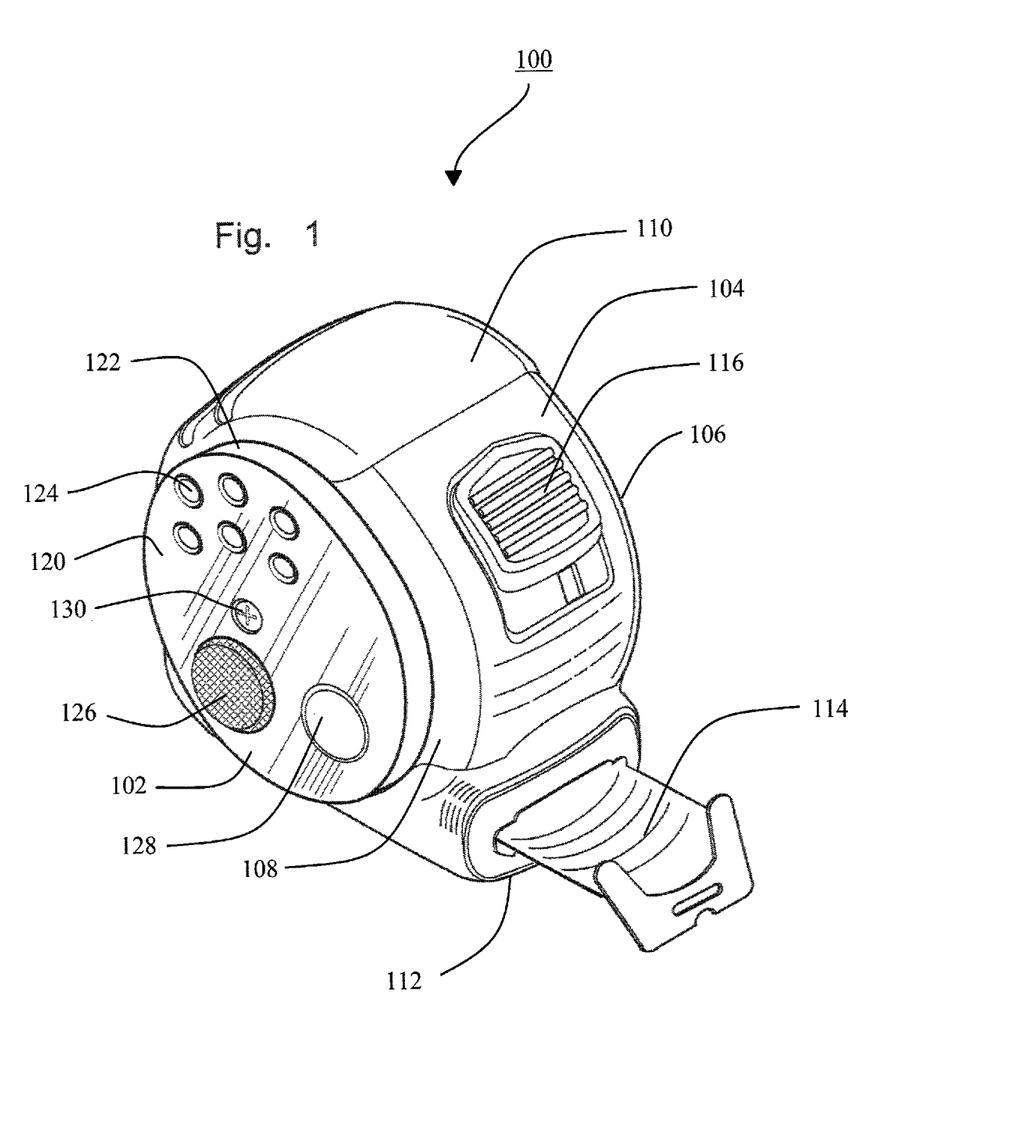
FIG. 1 is a top schematic perspective view of a tape measure with an voice recorder.

Conventional tape measure shown as 104 in FIG. 1 includes a right side 106, a left side 108, a top side 110, a bottom side 112, also includes tape blade 114 and a blade lock 116.

Figure 2:
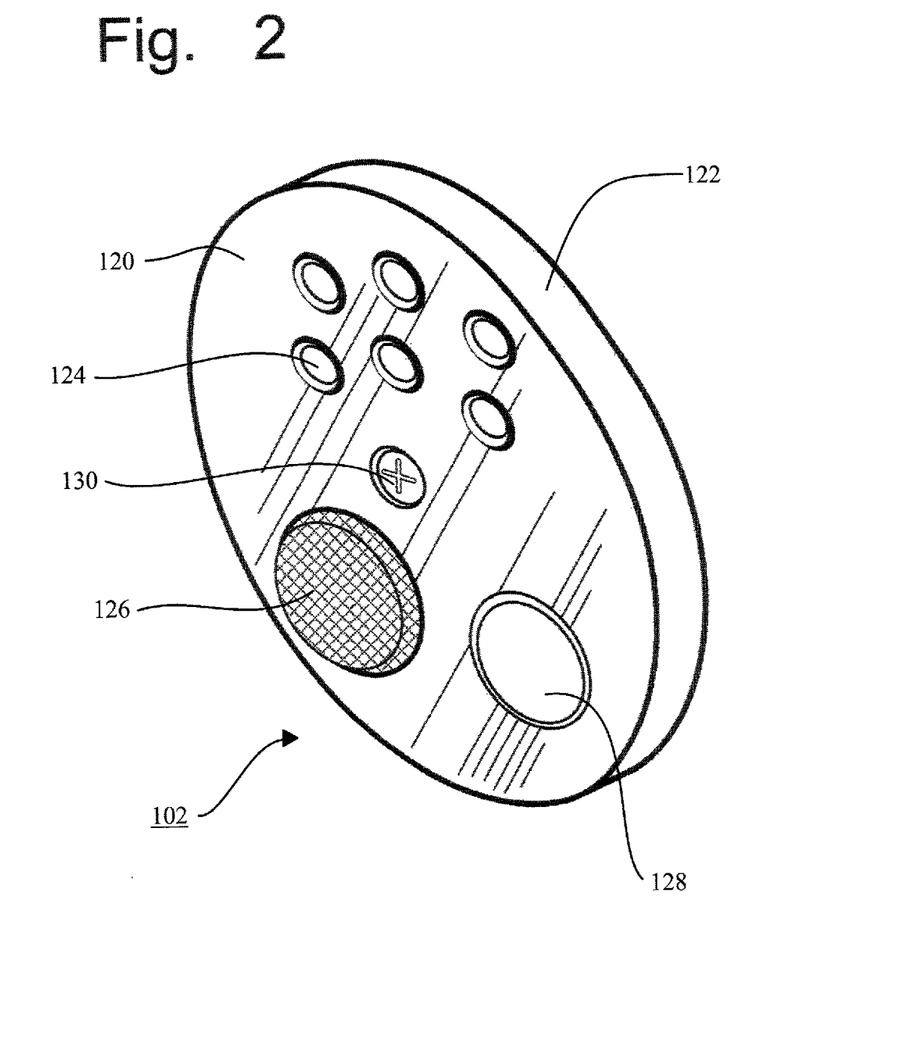
FIG. 2 is a front schematic perspective view of the voice recorder attached on the tape measure.

Voice recorder 102 includes the following components namely front cover 120 and outer cover 122, push buttons 124, speaker 126, battery cover 128 and a screw 130.

Figure 3:
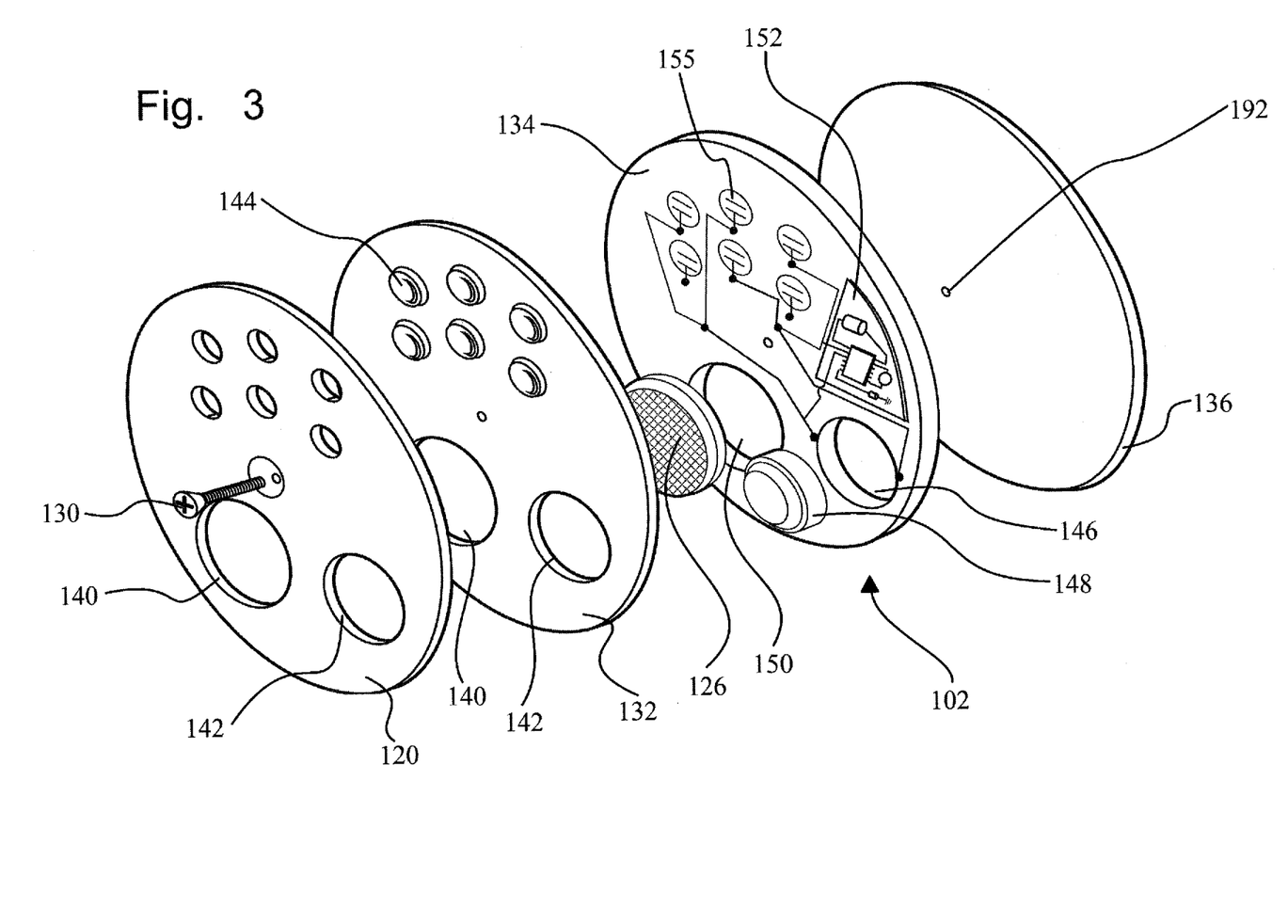
FIG. 3 is a schematic perspective exploded view of the voice recorder shown in FIG. 2.

Referring now to FIG. 3 voice recorder 102 is shown in exploded fashion with outer cover 122 removed.

Voice recorder 102 includes front cover 120 a push pad 132, a circuit board 134, a back cover 136.

Front cover 120 includes speaker cut-out 140 and a battery aperture 142 and screw 130 passes there-though approximately at the centre of front cover 120.

Push pad 132 includes 6 button pads shown as 144 as well as a battery aperture 142 and speaker cut-out 140.

Circuit board 134 includes a battery compartment 146 housing a battery 148 as well as a speaker compartment 150 housing a speaker with an integrated speaker cover 126.

Circuit board 134 also includes button contacts 155 in order to close the circuit when a button pad 144 is pushed using finger pressure from the outside of voice recorder 102. Circuit board 134 also includes an integrated circuit 152 which includes the electronic circuitry for recording audio signals as well as playing back audio signals when required.

Circuit board 134 is sandwiched between push pad 132 and back cover 136.

Figure 4:
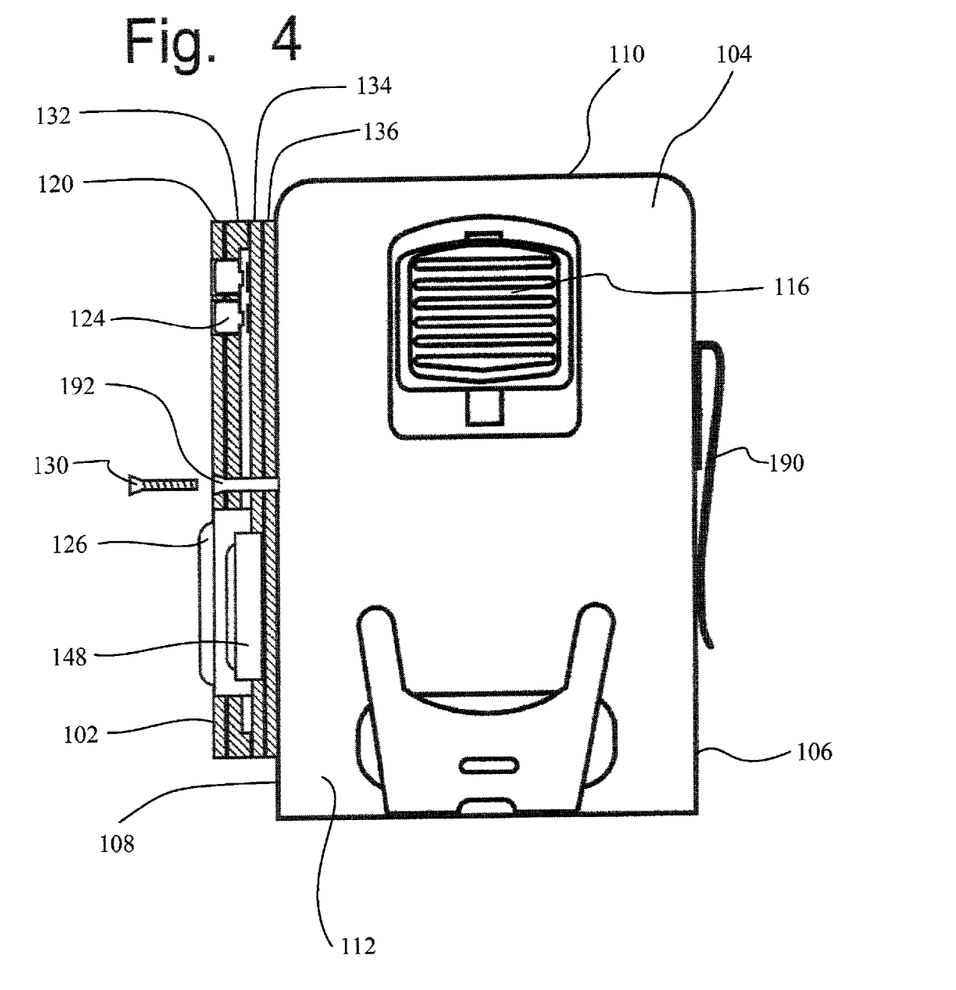
FIG. 4 is a schematic partial cross-sectional of a voice recorder shown attached to a tape measure.

The four major components namely front cover 120, push pad 132, circuit board 134 and back cover 136 are assembled in sandwich fashion as shown in FIGS. 3 and 4 and held together with screw 130 which passes through each of these components and into the left side of tape measure 104.

FIG. 4 shows voice recorder 102 mounted onto the left side of tape measure 104. Screw 130 passes through screw hole 192 and into left side 108 of the body of tape measure 104 thereby securing voice recorder 102 abutting against and onto the left side 108 of tape measure 104. Tape measure 104 also includes a belt clip 190.

Figure 5:
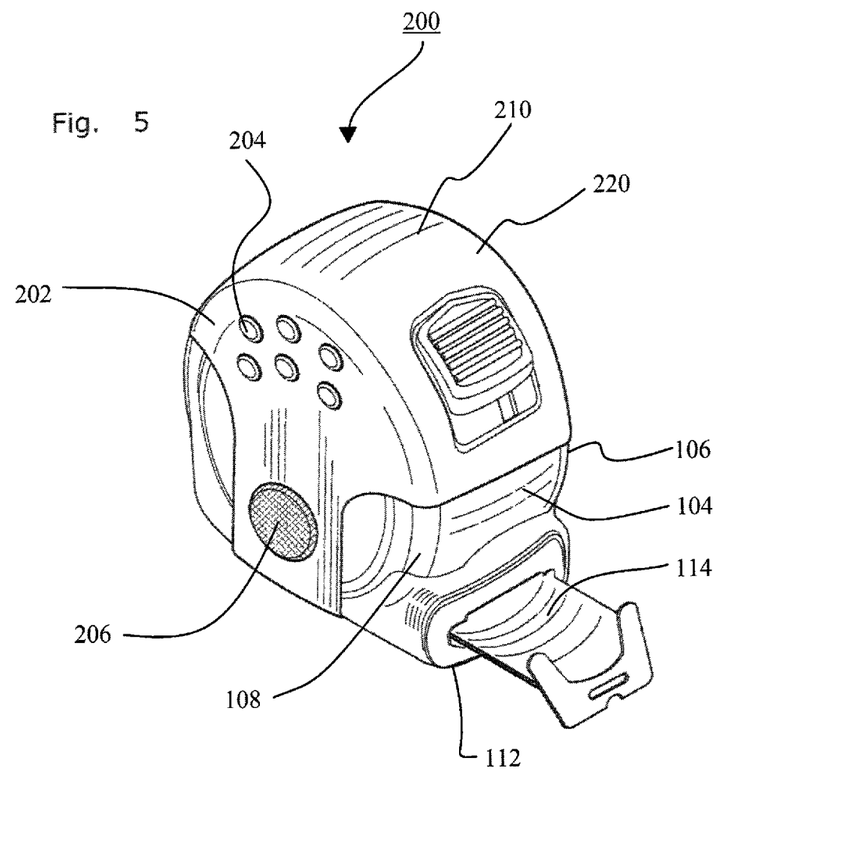
FIG. 5 is a top schematic perspective view of an alternate embodiment of the present invention namely a tape measure with audio recorder.
Figure 6:
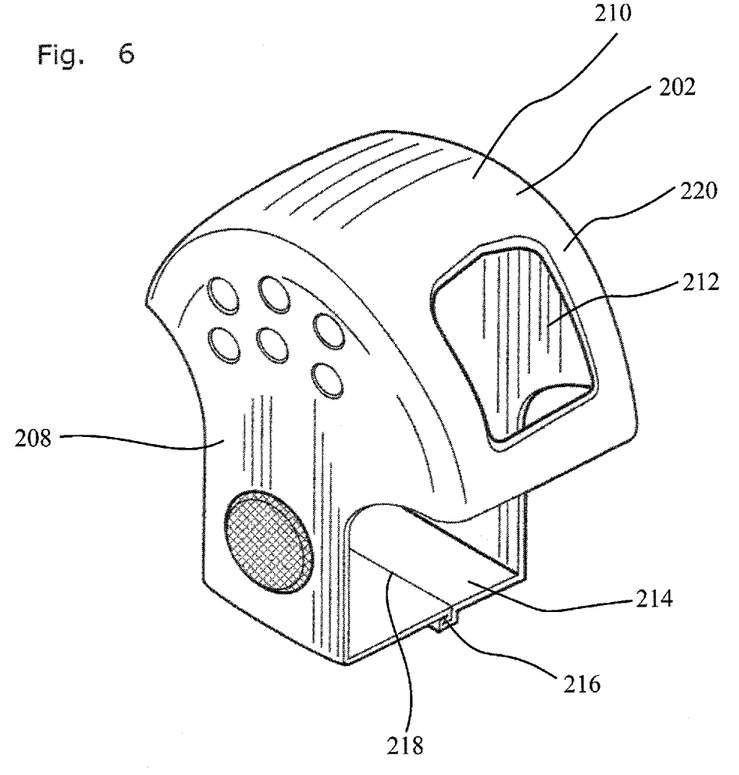
FIG. 6 is a top perspective view of the voice recorder shown in FIG. 5 detached from the tape measure.

Referring now to FIGS. 5 and 6 which shows an alternate embodiment namely tape measure with audio recorder 200 which includes a detachable recorder case 220 which includes push buttons 204, speaker 206, left portion 208, right portion 212, top portion 210 and bottom portion 214.

Recorder case 220 of voice recorder 202 has a releasable interlock 216 which forms an inner lock seam 218 as shown in FIG. 6.

In other words recorder case 220 can be easily attached and removed from tape measure 104 by simply locking into position inter lock 216 and/or unlocking inter lock 216 as required.

In Use

In use tape measure with audio recorder 100 and/or tape measure with audio recorder 200 can record audio signals of the user. In other words someone taking a measurement with tape measure 104 can push one of the push buttons 124 and/or push button 204 which will start a voice recording of a particular measurement that is presently being taken.

Upon release of push button 124 and/or 204 the recording ends.

The user can then record a second measurement using a different push button 124 and/or 204 that was initially and again the voice recording is recorded by voice recorder 102 and/or voice recorder 202 and the recording ends when the push button is released.

In this manner up to six different voice recordings and measurements can be recorded and taken by voice recorder 102 and/or voice recorder 202 thereby helping the user to remember the measurements that have been taken with the tape measure 104.

Other Embodiments

Figure 7:
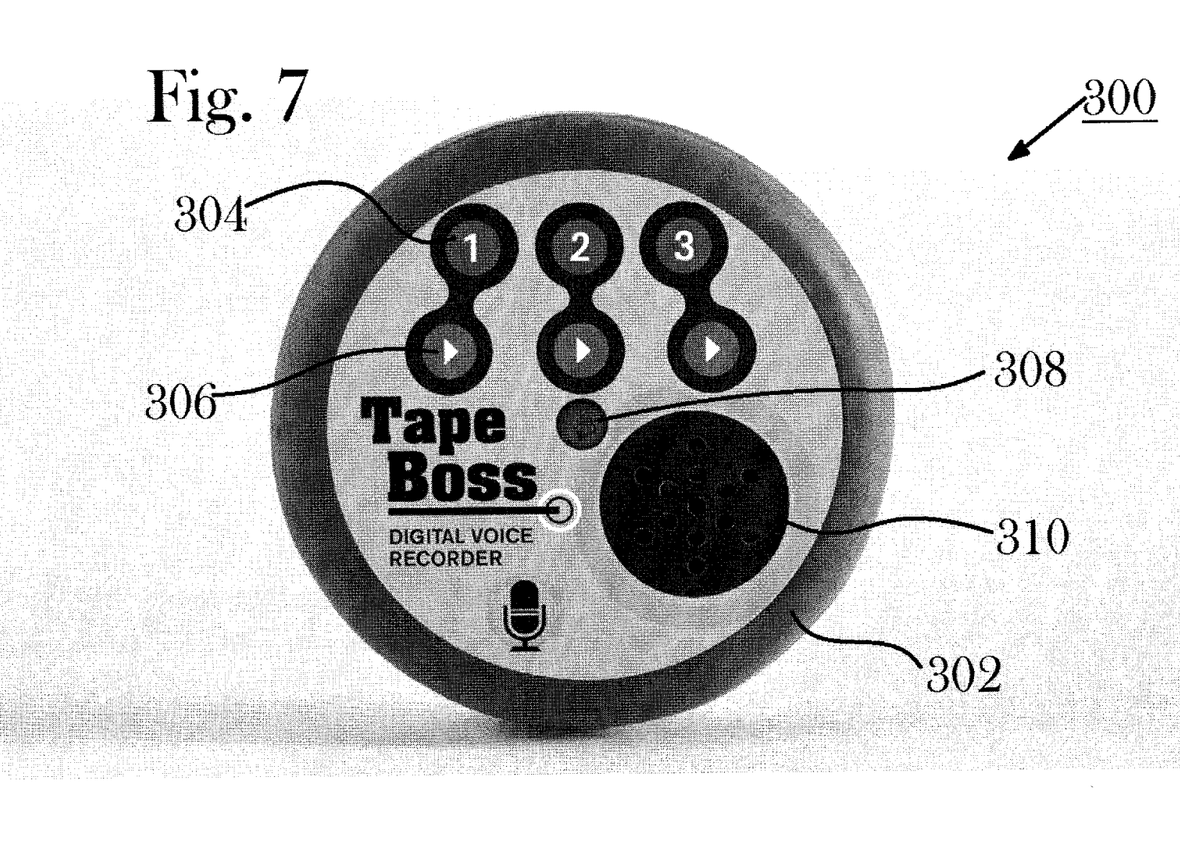
FIG. 7 is a front schematic plan view of a tape measure attachment.

FIG. 7 depicts another embodiment namely a tape measure attachment shown generally as 300 which includes the following major components namely a housing 302, three record buttons 304, three replay buttons 306, a mounting screw 308, a speaker 310.

Tape measure attachment 300 is used in similar if not identical fashion to tape measure with audio recorder 100 except for the fact that tape measure attachments 300 includes three separate record buttons and three separate reply buttons. Tape measure attachment 300 can be attached to the side of a tape measure in similar fashion as shown for tape measure with audio recorder 100 in FIG. 1 or also could be integrally part of an originally equipment produced tape measure.

Tape measure attachment 300 can record three separate recordings by pushing record button 304 number "1", "2" or "3". In order to play back the voice recordings one would simply hit the replay button 306 corresponding to the record button.

Once three recordings have been completed with record buttons 1, 2 and 3, one can simply overwrite what has been recorded at button 1 by simply pressing again on record button number 1 304 and making a new recording. The previous recording will be erased.

Figure 8:
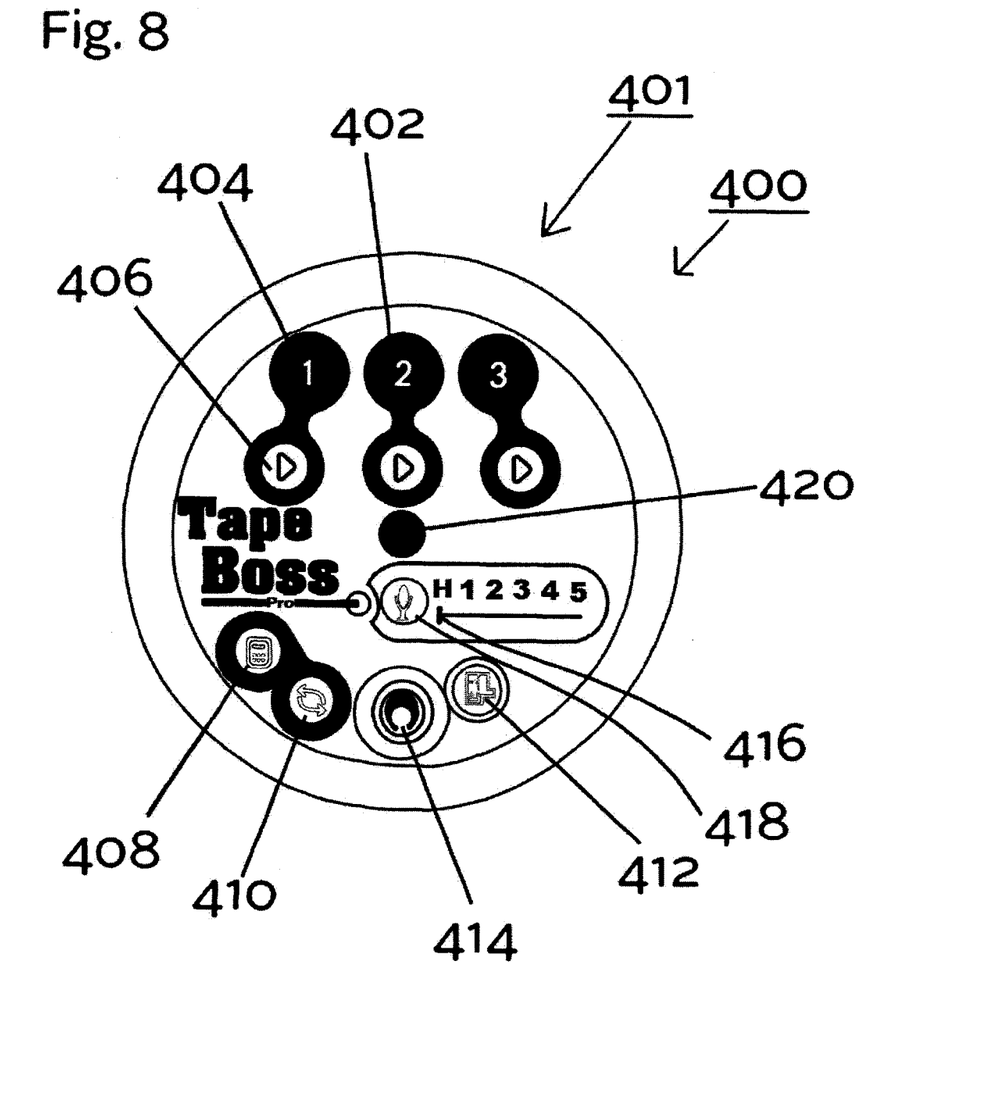
FIG. 8 is a front schematic plan view of a tape measure attachment.

FIG. 8 shows data transceiver 401 which could be a tape measure attachment 400 or could be integrally part of a tape measure having the following major components namely three record buttons 404, three playback buttons 406, similar to tape measure 300 and additionally it also includes a calculate button 408, a playback button 410, a drawing button 412 which controls LED Projector 414, a walkie talkie button 418, and a user selector 416.

Data transceiver 401 shown as a tape measure attachment 400 is held on with a screw 420 onto any standard tape measure and includes a housing 402.

In similar fashion as tape measure with audio recorder 100 data transceiver 401 can either be screwed onto an existing tape measure 104 as shown in FIG. 1 or it can be made integrally part of an original equipment tape in which case data transceiver 401 components would be integrally made together with a tape measure 104 from the outset.

data transceiver 401 has the added advantage that it can communicate either wired or wirelessly to any cell phone either by blue tooth or by other wireless means.

Figure 9:
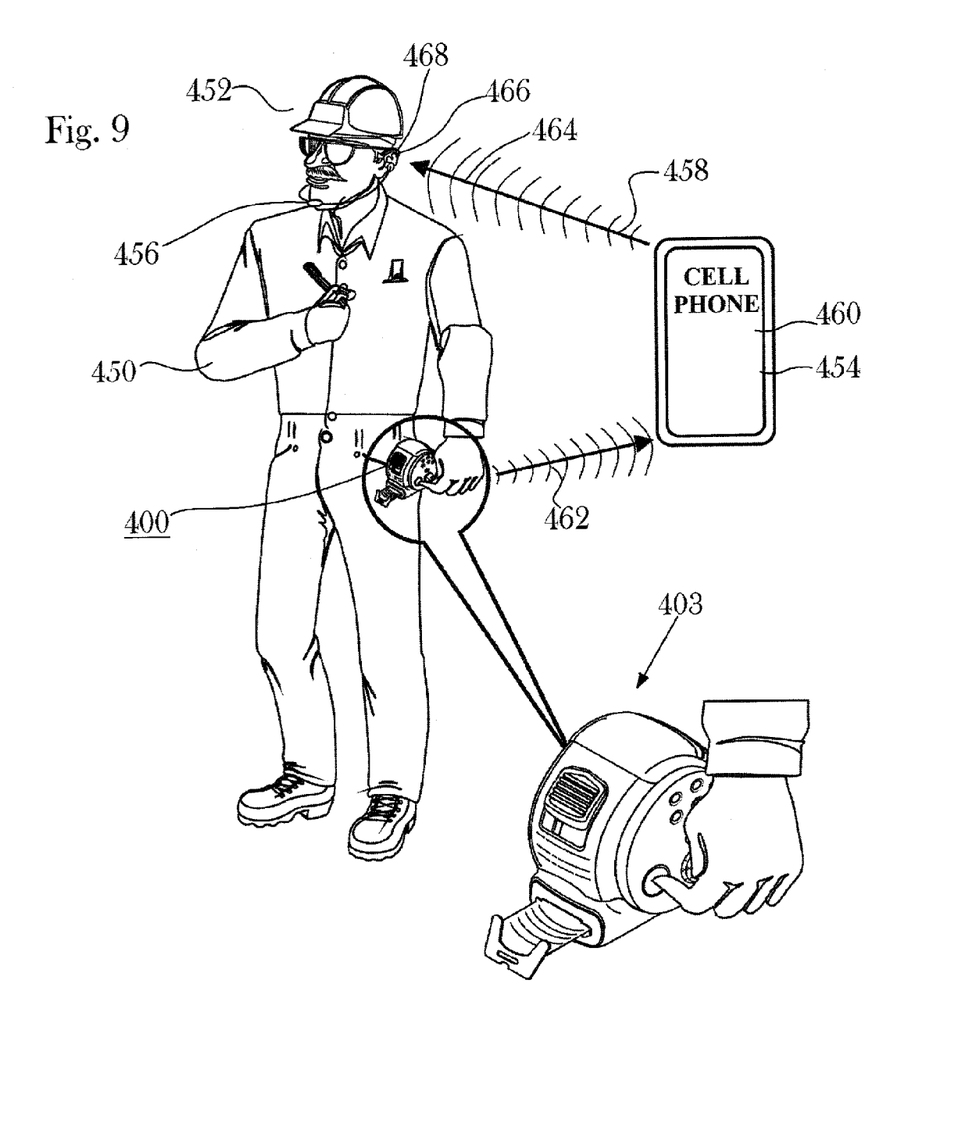
FIG. 9 is a schematic diagram showing a tape measure attachment 400 deployed onto a person together with the interaction of the signals of a cell phone.

Shown in FIG. 9 schematically is data transceiver 401 deployed onto a person 450 which has been fitted with a headset 452 and also has a cell phone 454. Headset 452 communicates with cell phone 460 with either a wired or wireless connection and can transmit and receive signals from cell phone 454. Cell phone 454 is equipped with an on board phone app 460 also referred to as cell phone application 460 which can convert audio signals into digital data using voice recognition software and additionally can store any data points received.

Person 450 could press for example the record button 404 on tape measure attachment 400 and then speak into mic 456 which would then send a headset send signal 458 to cell phone 454 where it is processed by phone app 460. Pressing of one of the record buttons 404 sends a tape signal 462 to cell phone 454 which is received by phone app 460 telling it to record the signal being received from the headset namely headset send signal 458.

It is also possible that data transceiver 401 when in the form of a digital tape measure 403 may measure digitally measurements and by pushing the record button 404 a signal is sent to cell phone 454 with the digital measurement to be recorded and at the same time phone app 460 sends a phone send signal to headset 452 with an audio announcement of the measurement being recorded for verification purposes.

By depressing for example playback button 406 the phone app 460 is instructed to send a phone send signal 464 which is intercepted by headset 452 by wireless receiver 466 which in turn communicates the signal to ear buds 468 where the measurement previously made on the phone app 460 is now replayed audibly into the persons 450 ears.

Figure 10:
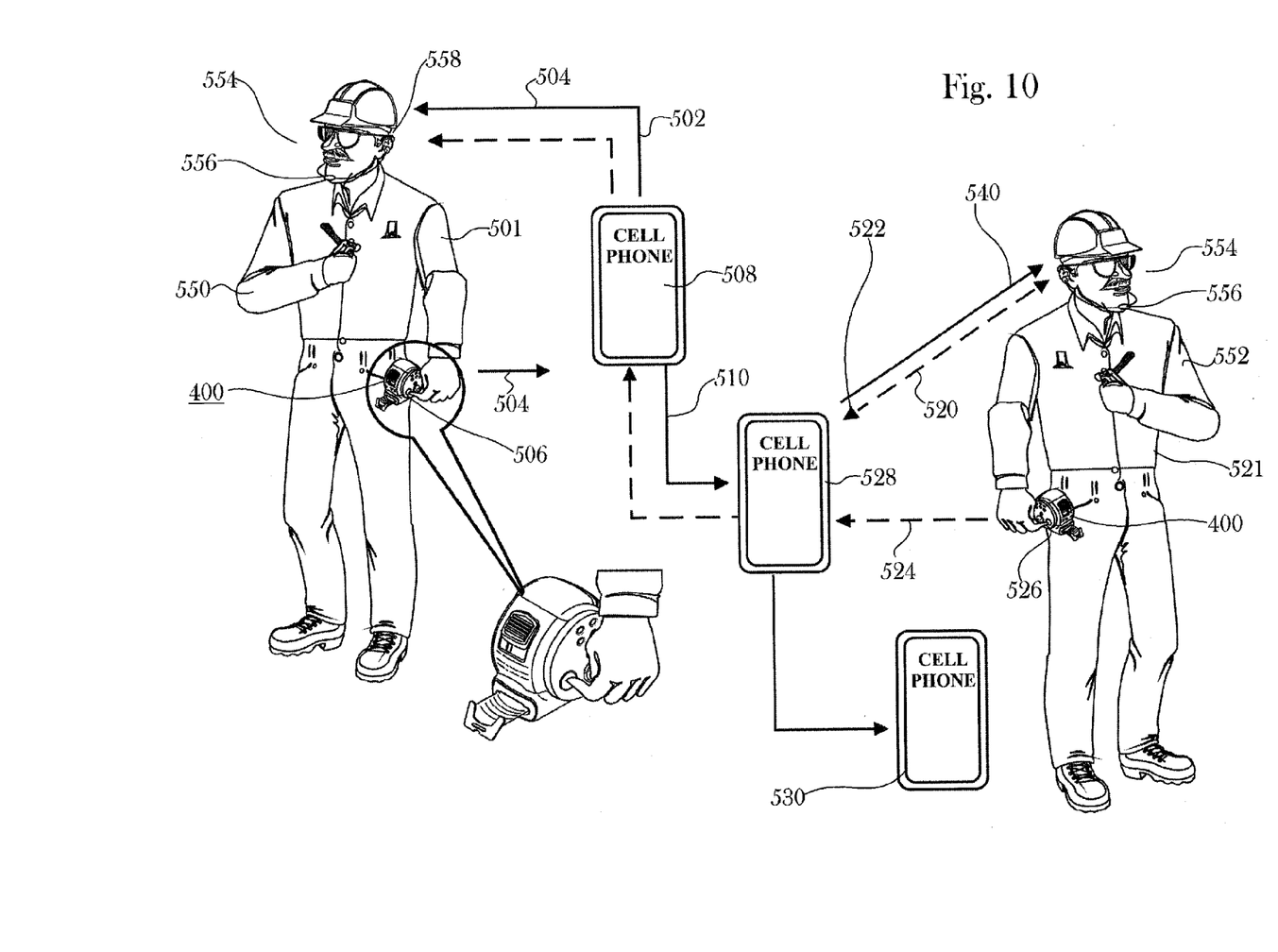
FIG. 10 is a schematic of two tape attachments deployed onto two independent persons together with the signal interaction between the tape measure attachments cell phones and head pieces.

FIG. 10 shows the interaction between two users namely a first person 550 and a second person 552 each having a headset 554 which includes a mic 556 and ear buds 558. In addition each person also has a tape measure attachment 400 shown as first tape 506 and second tape 526 which communicates to respective cell phones namely first phone 508 and second phone 528.

In similar fashion as previously described for a single person user first person 550 for example could make a recording by pushing record button 1 404 which sends a first tape signal 504 to cell phone telling it to record the measurement that will be received from headset 554 as headset sends signal 502.

With the user selector 416 in the H position by pressing on the playback button 406 this commands the first phone 508 to send a phone send signal 504 to headset 554 thereby replaying the measurement that was recorded with record button 1 404.

In this example if the user selector 416 is for example in the 2 position and second user 521 has been assigned the number 2 position then in addition to first person 550 hearing the recorded measurement also second user 521 will also hear the recorded measurements since first phone 508 is now instructed to send a phone send signal 504 not only to headset 554 but also onto second phone 528 which will then further send on the measurement to second person 552 via phone send signal 540 as shown in FIG. 2.

Therefore by moving user selector 416 to various positions up to a total of five users the information that first person 550 is storing on his first phone 508 can be shared with any one of the other five users by simply moving the user selector knob 416 to correct position.

Secondly second user 521 shown as second person 552 can also make recordings on his second tape 526 which will send a second tape signal 524 to his second phone 528 which in turn can be reviewed by second user 521 with a phone send signal 520 or the signal can be sent on to for example first person 550 by selecting position number 1 in the case that person has been assigned position number 1 or to some other position such as third phone 530 which may be assigned user selector 416 knob position number 3.

Therefore the reader will note that information that is stored by any of the tape measures namely first tape 506, second tape 526, and up to five separate tapes; this information can be replayed back to the user of that particular tape and/or the information on that tape can be sent on to any of the other users by selecting the appropriate user selector position 416.

Additionally all of the linked users 1 through 5 can also talk with each other in walkie-talkie fashion by simply selecting the user you wish to talk to by moving user selector knob 416 to the proper position and then pushing the walkie-talkie button 418 and speaking into the mic 556.

Therefore in this example first user 501 for example could with the user selector knob into the number 2 position which corresponds to second user 521 and push the walkie-talkie button 418 and then begin speaking to second user 521 in walkie-talkie fashion.

Additionally by pushing the calculate button 408 one is able to record by voice a calculation that one would like the app to carry out for example 25.5+32.25.

By pushing the respond button 410 the app is prompt to respond with an answer to the user through the headset 554.

Additionally it is possible to download drawings onto the phone app 416 by pressing on the drawing button 412 this would illuminate the LED projector light 414 and the drawings would be projected onto any flat surface.

Figure 11:
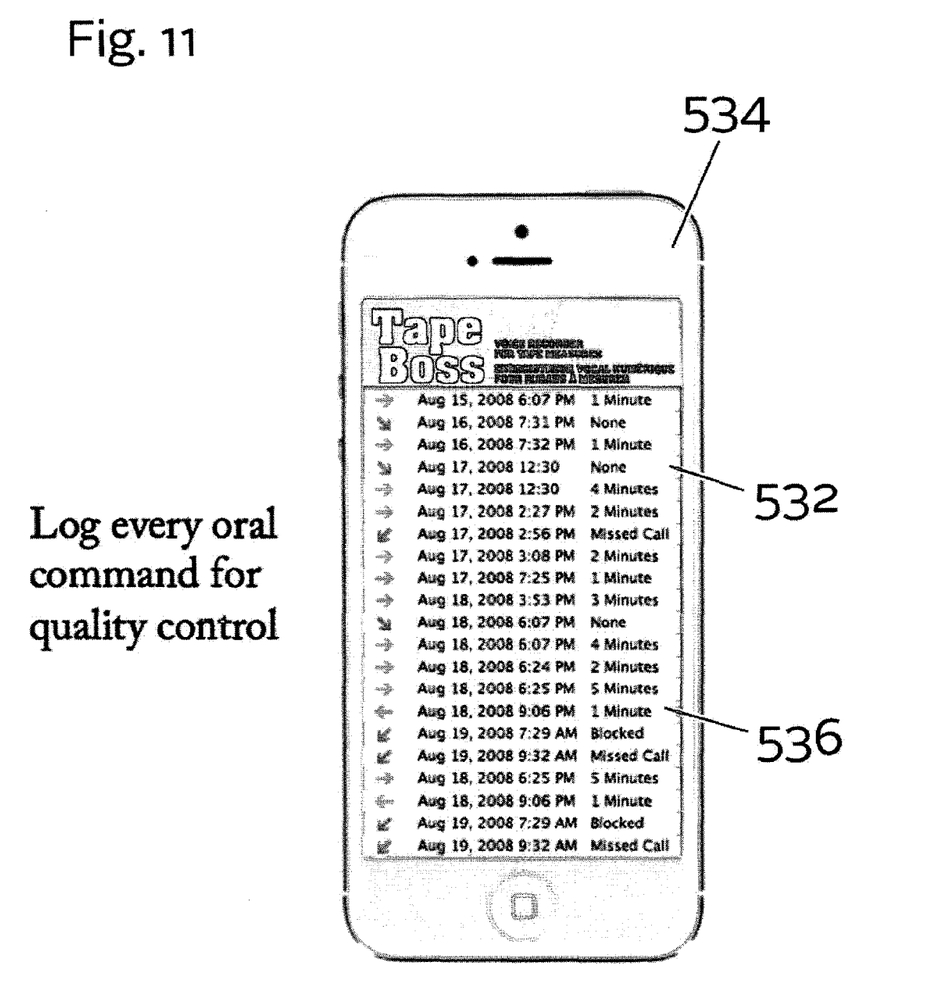
FIG. 11 is a schematic screen shot of a cell phone showing a data lock.

Additionally and referring now to FIG. 11 cell phone 534 for example which contains phone app 536 will record a log of all of the measurements that have been recorded over time and create data log 532 as shown schematically in FIG. 11.

Figure 12:
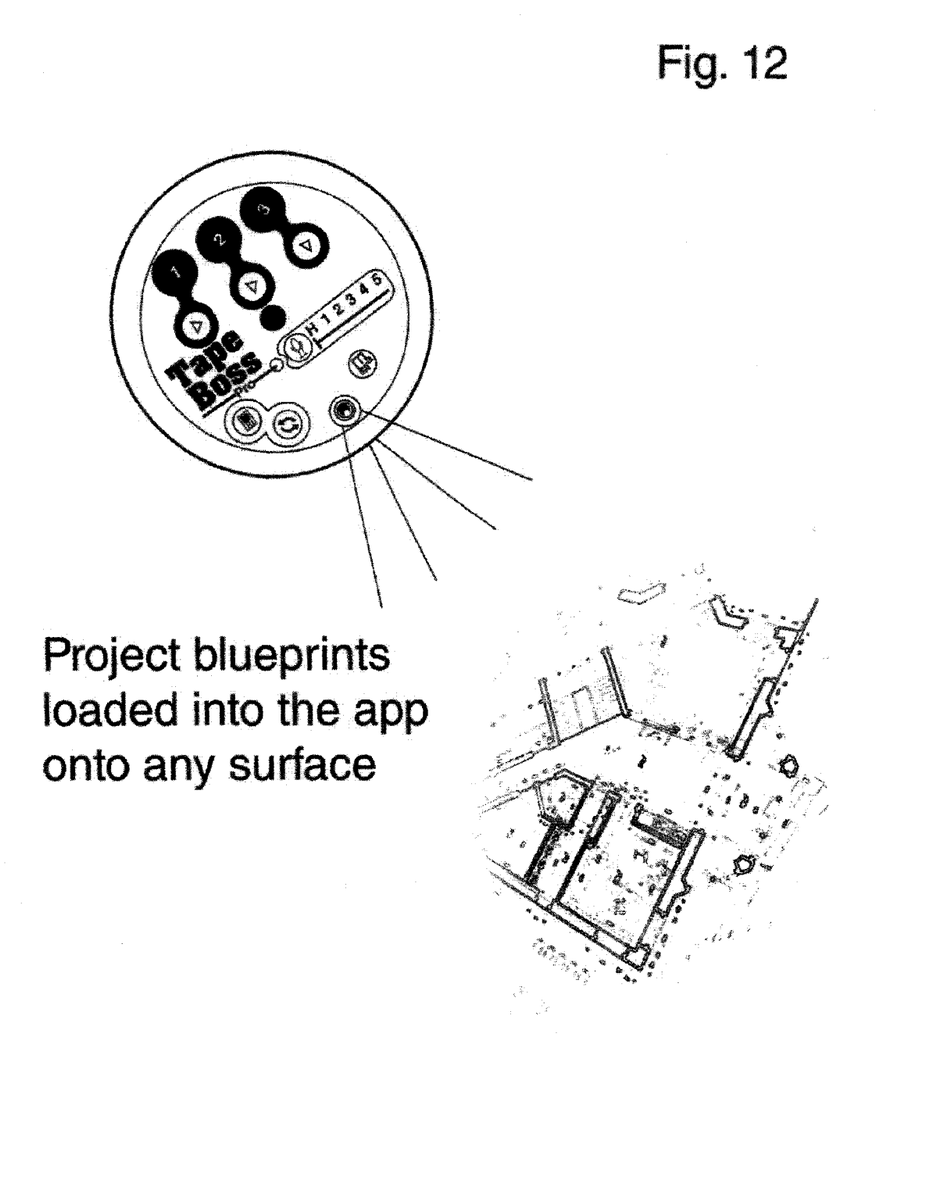
FIG. 12 is a schematic showing the LED projector projecting an image of a blueprint onto a surface.

FIG. 12 shows schematically how a LED projector light 414 could for example project drawings onto a flat surface.

It is also possible to use a digital tape measure which directly converts the tape position into digital measurement data thereby skipping the voice recording of the measurement. In this case the transceiver would send the digital data from the tape measure directly to the cell phone.

It should be apparent to persons skilled in the arts that various modifications and adaptation of this structure described above are possible without departure from the spirit of the invention the scope of which defined in the appended claim.

I claim:

1. A tape measure in combination with an attachable data transceiver, a headset and a cell phone comprising:
   a) a data transceiver for mounting to a tape measure;
   b) the data transceiver includes a housing with numerous selectors including at least one record button and one playback button; the transceiver housing for mounting to a tape measure;
   c) the transceiver is in communication with a first user cell phone, wherein depressing the record button instructs the cell phone to record verbal analogue data received from a headset.

2. The combination claimed in claim 1 wherein the cell phone includes a cell phone application for recording and playback of analogue data.

3. The combination claimed in claim 1 wherein the cell phone including a cell phone application for converting verbal analogue data into digital data using voice recognition software and recording and playback of the digital data.

4. The combination claimed in claim 3 wherein the data transceiver further includes a calculate button selector which when pushed instructs the cell phone application to add together the last two recorded data points and record a calculated addition.

5. The combination claimed in claim 4 wherein the data transceiver further includes a respond button selector which when pushed instructs the cell phone application to playback the calculated addition to the user selected headsets.

6. The combination claimed in claim 1 wherein when the at least one playback button is depressed the data transceiver instructs the cell phone to playback the recorded digital data to the headset.

7. The combination claimed in claim 6 further including at least two users, each user includes a data transceiver including a user selector, a tape measure, a headset and a cell phone, the user selector for instructing connection of the first users cell phone to at least one other second user cell phone by placing the user selector in the appropriate position, such that depressing the record button instructs simultaneous recordation of data received from a first headset onto the first and second user's cell phone wherein each cell phone is equipped with the cell phone application and is in communication with an associated headset.

8. The combination claimed in claim 7 such that depressing the playback button on either the first or second users data transceiver instructs simultaneous playback of data on the first user's cell phone to the first and the second user's headsets.

9. The combination claimed in claim 7 wherein the data transceiver further includes a walkie-talkie button selector which when pushed instructs the cell phone application
   to transmit in real time any voice data received from first users headset to the user selected phone and associated headset, thereby permitting selected users to speak to each other in walkie-talkie fashion.

10. The combination claimed in claim 7 such that depressing the playback button on either the first or second users data transceiver instructs simultaneous playback of data on the first user's cell phone to the first and the second user's headsets.

11. The combination claimed in claim 1 wherein the data transceiver further includes a drawing button selector which when pushed instructs the cell phone application to project drawings stored in the cell phone using a LED projector light in the tape measure.

12. The combination claimed in claim 1 wherein the digital data is numerical tape measurements.

13. The combination claimed in claim 1 wherein the data transceiver attached to the tape measure with a centrally located fastener.

14. The combination claimed in claim 1 wherein the data transceiver includes a cylindrical puck shaped housing for attaching to a side of the tape measure using a centrally located screw.

15. A digital tape measure in combination with a data transceiver, a headset and a cell phone comprising:
   a) a data transceiver;
   b) the data transceiver includes a housing with numerous selectors including at least one record button and one playback button; the transceiver receiving digital measurement data from the tape measure when the tape of the tape measure is extended;
   c) the transceiver in communication with a first user cell phone, wherein depressing the record button instructs the cell phone to record digital data received from the tape measure;
   d) the cell phone including a cell phone application for communicating and storing digital data.

16. The combination claimed in claim 15 wherein when the at least one playback button is depressed the data transceiver instructs the cell phone to playback the recorded digital data to the headset.

17. The combination claimed in claim 16 further including at least two users, each user includes a data transceiver including a user selector, a tape measure, a headset and a cell phone, the user selector for instructing connection of the first users cell phone to at least one other second users cell phone by placing the user selector in the appropriate position, such that depressing the record button instructs simultaneous recordation of data received from a first tape measure onto the first and second user's cell phone wherein each cell phone is equipped with the cell phone application and is in communication with an associated headset.

18. A tape measure in combination with a data transceiver, a headset and a cell phone comprising:
   a) a data transceiver integrally part of the tape measure;
   b) the data transceiver includes a housing with numerous selectors including at least one record button and one playback button;
   c) the transceiver is in communication with a first user cell phone, wherein depressing the record button instructs the cell phone to record verbal analogue data received from a headset.

19. The combination claimed in claim 18 wherein when the at least one playback button is depressed the data transceiver instructs the cell phone to playback the recorded data to the headset.

20. The combination claimed in claim 19 further including at least two users, each user includes a data transceiver including a user selector, a tape measure, a headset and a cell phone, the user selector for instructing connection of the first users cell phone to at least one other second user cell phone by placing the user selector in the appropriate position, such that depressing the record button instructs simultaneous recordation of data received from a first headset onto the first and second user's cell phone wherein each cell phone is equipped with the cell phone application and is in communication with an associated headset.

* * * * *